(12) United States Patent
Xie et al.

(10) Patent No.: US 11,514,315 B2
(45) Date of Patent: Nov. 29, 2022

(54) DEEP NEURAL NETWORK TRAINING METHOD AND APPARATUS, AND COMPUTER DEVICE

(71) Applicant: Hangzhou Hikvision Digital Technology Co., Ltd., Hangzhou (CN)

(72) Inventors: Di Xie, Hangzhou (CN); Shiliang Pu, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 301 days.

(21) Appl. No.: 16/771,944

(22) PCT Filed: Dec. 7, 2018

(86) PCT No.: PCT/CN2018/119725
§ 371 (c)(1),
(2) Date: Jun. 11, 2020

(87) PCT Pub. No.: WO2019/114618
PCT Pub. Date: Jun. 20, 2019

(65) Prior Publication Data
US 2021/0073628 A1 Mar. 11, 2021

(30) Foreign Application Priority Data
Dec. 12, 2017 (CN) .......................... 201711319390.9

(51) Int. Cl.
*G06N 3/08* (2006.01)
*G06K 9/62* (2022.01)

(52) U.S. Cl.
CPC ............ *G06N 3/08* (2013.01); *G06K 9/6215* (2013.01); *G06K 9/6218* (2013.01); *G06K 9/6232* (2013.01)

(58) Field of Classification Search
None
See application file for complete search history.

(56) References Cited

U.S. PATENT DOCUMENTS 9,564,123 B1 2/2017 Mont-Reynaud et al.

FOREIGN PATENT DOCUMENTS

| CN | 106295803 | 1/2017 |
| CN | 107368294 | 11/2017 |
| CN | 107424612 | 12/2017 |

OTHER PUBLICATIONS

Neural decision trees, by Balestriero, arXiv: 1702.07360v2 [stat. ML] Mar. 6, 2017 (Year: 2017).*

(Continued)

*Primary Examiner* — Vikkram Bali
(74) *Attorney, Agent, or Firm* — Norton Rose Fulbright US LLP

(57) ABSTRACT

A deep neural network training method and apparatus and a computer device are provided. The deep neural network training method includes: obtaining task attributes of nodes in a current network layer in a tree-like network topology (S101); performing cluster analysis on the nodes in the current network layer based on the task attributes of the nodes in the current network layer and extracting a common part of task attributes of multiple nodes in a same category as a task attribute for a parent node of the multiple nodes (S102); training a network parameter of each parent node based on a task attribute of this parent node (S103); and determining that training of a deep neural network corresponding to the tree-like network topology is completed, after completion of training of all nodes in all network layers (S104). The operation efficiency of deep learning can be improved through this solution.

10 Claims, 2 Drawing Sheets

(56) References Cited

OTHER PUBLICATIONS

Amiri et al., "Dynamic Multiscale Tree Learning Using Ensemble Strong Classifiers for Multi-label Segmentation of Medical Images with Lesions" arXiv.org, Sep. 5, 2017, pp. 1-9. *Online Library Cornell University*, XP888818716.
Extended European search report issued in Corresponding European Application No. 18889433.1, dated Feb. 16, 2021.
Fan et al., "HD-MTL: Hierarchical Deep Multi-Task Learning for Large-Scale Visual Recognition" *IEEE Transactions on Image Processing* 2017, 26(4), 1923-1938.
Lu et al., "Fully-adaptive Feature Sharing in Multi-Task Networks with Applications in Person Attribute Classification" arXiv.org, Nov. 16, 2016, pp. 1-10. *Online Library Cornell University*, doi:10.1109/CVPR.2017.126.
International Search Report and Written Opinion issued in Corresponding PCT Application No. PCT/CN2018/119725, dated Mar. 6, 2019. (English Translation provided).

\* cited by examiner

DEEP NEURAL NETWORK TRAINING METHOD AND APPARATUS, AND COMPUTER DEVICE

CROSS REFERENCE TO RELATED APPLICATIONS

The present application is a national phase application under 35 U.S.C. § 371 of International Application No. PCT/CN2018/119725, filed Dec. 07, 2018, which claims the benefit of priority to Chinese patent application No. 201711319390.9, filed with the China National Intellectual Property Administration on Dec. 12, 2017 and entitled "Deep Neural Network Training Method and Apparatus, and Computer Device", each of which are incorporated herein by reference in their entirety.

TECHNICAL FIELD

The present application relates to the technical field of machine learning, in particular, to a deep neural network training method and apparatus and a computer device.

BACKGROUND

Deep learning is a class of machine learning algorithms that are based on artificial intelligence neural networks. Deep neural networks, as main models of deep learning, interpret data by simulating a human brain mechanism. Deep neural networks are intelligent models for analysis and learning by establishing and simulating a human brain, and has been used on a wide range of applications such as speech recognition, image classification, face recognition, natural language processing, and advertising.

At present, most deep learning are only for a single task, for example, detection of an attribute of a target, estimation of the state of a target, etc. However, complex scenarios usually require multiple tasks. Common approaches for multiple tasks use multiple neural networks to perform calculations for the tasks separately, and combine results of the calculations. Such approaches are very time-consuming, and result in a deep learning with low efficiency due to high redundancy in the neural networks.

SUMMARY

The objective of embodiments of the present application is to provide a deep neural network training method and apparatus and a computer device, to improve the operation efficiency of deep learning. Specific details of the technical solutions are described below.

In a first aspect, an embodiment of the present application provides a deep neural network training method, which includes:

obtaining task attributes of nodes in a current network layer in a tree-like network topology, wherein the nodes in the tree-like network topology correspond to neural networks for different tasks, and a leaf node in the tree-like network topology is a neural network that has been trained for a specified task;

performing cluster analysis on the nodes in the current network layer based on the task attributes of the nodes in the current network layer and extracting a common part of task attributes of multiple nodes in a same category as a task attribute for a parent node of the multiple nodes;

training a network parameter of each parent node based on a task attribute of this parent node; and determining that training of a deep neural network corresponding to the tree-like network topology is completed, after completion of training of all nodes in all network layers.

Optionally, performing cluster analysis on the nodes in the current network layer based on the task attributes of the nodes in the current network layer and extracting a common part of task attributes of multiple nodes in a same category as a task attribute for a parent node of the multiple nodes includes:

generating a similarity measurement matrix corresponding to the task attributes of the nodes in the current network layer by using a preset similarity measurement algorithm based on the task attributes of the nodes;

assigning multiple nodes having a similarity greater than a preset threshold into a same category according to the similarity measurement matrix; and extracting a common part of the task attributes of the multiple nodes in the same category as the task attribute for a parent node of the multiple nodes.

Optionally, training a network parameter of each parent node based on a task attribute of this parent node includes:

for any parent node, using output features of child nodes of the parent node as input of the parent node, to train a network parameter of the parent node based on the task attribute of the parent node.

Optionally, training a network parameter of each parent node based on a task attribute of this parent node includes:

for any parent node, generating the parent node using a preset structure with a feature signal control mechanism based on a task attribute of the parent node; obtaining and weighting output features associated with the task attribute in output features of child nodes of the parent node; and training a network parameter of the parent node according a combination of the weighted output features.

Optionally, determining that training of a deep neural network corresponding to the tree-like network topology is completed, after completion of training of all nodes in all network layers includes:

training nodes in each network layer starting from a network layer where the leaf nodes are located and in a sequence from a bottom layer to a top layer, to determine network parameters of each node in each network layer; and determining that the training of the deep neural network corresponding to the tree-like network topology is completed after completion of training of all nodes in the top layer.

In a second aspect, an embodiment of the present application provides a deep neural network training apparatus, which includes:

an obtaining module, configured for obtaining task attributes of nodes in a current network layer in a tree-like network topology, wherein the nodes in the tree-like network topology correspond to neural networks for different tasks, and a leaf node in the tree-like network topology is a neural network that has been trained for a specified task;

a clustering module, configured for performing cluster analysis on the nodes in the current network layer based on the task attributes of the nodes in the current network layer and extracting a common part of task attributes of multiple nodes in a same category as a task attribute for a parent node of the multiple nodes;

a training module, configured for training a network parameter of each parent node based on a task attribute of this parent node; and a determining module, configured for determining that training of a deep neural network corresponding to the tree-like network topology is completed, after completion of training of all nodes in all network layers.

Optionally, the clustering module is specifically configured for:

generating a similarity measurement matrix corresponding to the task attributes of the nodes in the current network layer by using a preset similarity measurement algorithm based on the task attributes of the nodes;

assigning multiple nodes having a similarity greater than a preset threshold into a same category according to the similarity measurement matrix; and extracting a common part of the task attributes of the multiple nodes in the same category as the task attribute for a parent node of the multiple nodes.

Optionally, the training module is specifically configured for:

for any parent node, using output features of child nodes of the parent node as input of the parent node, to train a network parameter of the parent node based on the task attribute of the parent node.

Optionally, the training module is specifically configured for:

for any parent node, generating the parent node using a preset structure with a feature signal control mechanism based on a task attribute of the parent node; obtaining and weighting output features associated with the task attribute in output features of child nodes of the parent node; and training a network parameter of the parent node according a combination of the weighted output features.

Optionally, the determining module is specifically configured for:

training nodes in each network layer starting from a network layer where the leaf nodes are located and in a sequence from a bottom layer to a top layer, to determine network parameters of each node in each network layer; and determining that the training of the deep neural network corresponding to the tree-like network topology is completed after completion of training of all nodes in the top layer.

In a third aspect, an embodiment of the present application provides a computer readable storage medium for storing executable codes that, when executed, perform the deep neural network training method provided by the embodiments of the present application in the first aspect.

In a fourth aspect, an embodiment of the present application provides an application program that, when executed, performs the deep neural network training method provided by the embodiments of the present application in the first aspect.

In a fifth aspect, an embodiment of the present application provides a computer device, which includes a processor and a computer readable storage medium, wherein the computer readable storage medium is configured for storing executable codes; and the processor is configured for executing the executable codes stored on the computer readable storage medium to carry out the deep neural network training method provided by the embodiments of the present application in the first aspect.

In summary, in the solutions provided by the embodiments of the present application, a tree-like network topology is constructed, and task attributes of nodes in a current network layer that has been trained in the tree-like network topology are obtained. Cluster analysis is performed on the nodes in the current network layer based on the task attributes, and a common part of task attributes of multiple nodes in a same category is used as a task attribute for a parent node of the multiple nodes. Then, a network parameter of each parent node can be trained based on the task attribute of this parent node. After completing the training of all nodes of all network layers, it can be determined that training of a deep neural network corresponding to the tree-like network topology is completed. The trained deep neural network can implement multiple tasks. Leaf nodes in the tree-like network topology are neural networks that have been trained for specified tasks. Thus, a neural network corresponding to a specified task can be reused by extracting a common part of task attributes of nodes in a network layer. A complete deep neural network can be used to implement multiple specified tasks through operations of network layers in tree-like network topology one by one. Further, the nodes are divided into categories by clustering based on their task attributes. A parent node for nodes of a same category can be constructed, and the parent node can realize a common task of its child nodes. Therefore, this can effectively reduce the redundancy between the neural networks and thereby improving the operation efficiency of deep learning.

BRIEF DESCRIPTION OF THE DRAWINGS

In order to more clearly describe the technical solutions of the disclosure and those of the prior art, drawings used to illustrate the disclosure and the prior art will be briefly described below. Apparently, the drawings below are illustrated by way of example only. Those of ordinary skill in the art can obtain further drawings based on these drawings without any creative efforts.

DETAILED DESCRIPTION

In order to make a thorough understanding of the objectives, technical solutions and advantages of the present application, details of embodiments of will be described with reference to the accompanying drawings. Obviously, the embodiments described are only some of the embodiments of the present application instead of all the embodiments. All further embodiments obtained by those of ordinary skills in the art based on the embodiments herein without any creative efforts are within the scope of the present application.

Specific details of embodiments will be given below.

In order to improve operation efficiency of deep learning, the present application provides a deep neural network training method and apparatus, and a computer device.

The deep neural network training method according to an embodiment of the present application will be now described below.

The deep neural network training method provided by the embodiments of the present application may be applied by an execution subject, such as a computer device that implements multiple specified tasks, which includes at least a core processing chip with data processing capabilities. The embodiments of the deep neural network training method may be implemented by at least one of software, a hardware circuit, and a logic circuit in the execution subject.

Figure 1:
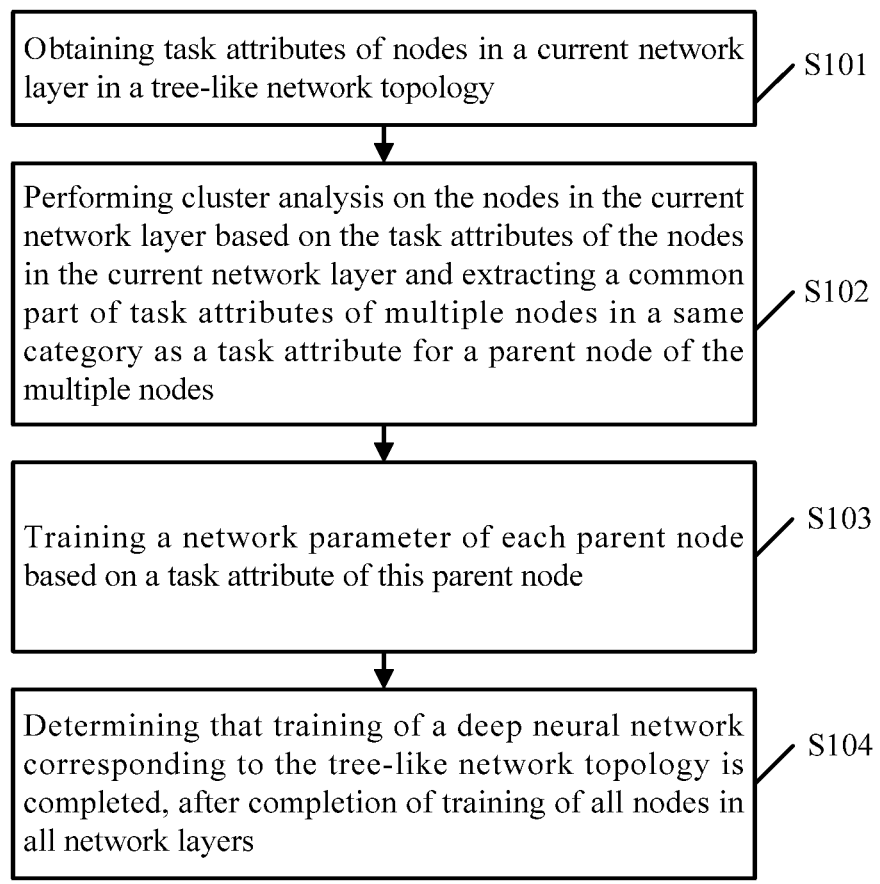
FIG. 1 is a schematic flow chart of a deep neural network training method according to an embodiment of the present application.

Referring to FIG. 1, a deep neural network training method provided by an embodiment of the present application is shown. The deep neural network training method may include the following steps.

At step S101, task attributes of nodes in a current network layer in a tree-like network topology are obtained.

For multiple specified tasks, neural networks for the specified tasks can be obtained by using a preset training algorithm(s), such as a back propagation algorithm, a forward propagation algorithm, a gradient descent training algorithm, etc. Each neural network can realize a specified task, for example, detection of an attribute of a target, estimation of the state of a target, etc. These tasks are generally similar in certain sense, and thus a redundancy exists between the neural networks that implements these tasks. That is to say, there are common network models in the trained neural networks implementing a same task. Based on such considerations, a complete deep neural network can be designed based on neural networks for performing different specified tasks to implement the specified tasks. The deep neural network may have a tree-like topology, each node in which may be a neural network for a respective task. There are three types of nodes in the tree-like network topology, which are leaf nodes, root nodes, and intermediate nodes. Since the purpose is to perform each of the specified tasks, the leaf nodes are neural networks that have been trained for respective specified tasks. A leaf node can be regarded as an encoder. The intermediate nodes and the root nodes are neural networks trained upwardly based on nodes at a lower layer.

At step S102, cluster analysis is performed on the nodes in the current network layer based on the task attributes of the nodes in the current network layer, and a common part of task attributes of multiple nodes in a same category is extracted as a task attribute for a parent node of the multiple nodes.

There is a certain similarity in tasks corresponding to respective nodes in a network layer in the tree-like network topology. For example, for a task of identifying the gender of a target and a task of estimating the age of a target, these two tasks require to detect a human body or face area first, and thus the gender identification and age estimation are carried out based on body or face detection. Therefore, two nodes corresponding to these two tasks can be grouped into a same category. The common part of these two tasks is detection of the human body or face area, and the detection of the human body or face area can be taken as a task attribute for the parent node of the two nodes. In this way, when using the deep neural network for calculations, tasks of detecting a human body or face area can be performed first; and after the human body or face area is detected, the tasks of identifying the gender of the target and estimating the age of the target are then performed.

Cluster analysis is a process for assigning data into different categories. Therefore, objects in a same category share similar characteristics. There are many techniques for cluster analysis, such as hierarchical cluster method, decomposition method, addition method, dynamic clustering method, etc., which are not limited herein. In an embodiment, the cluster analysis is to divide nodes with similar task attributes into a same category. Therefore, the tasks can be assigned into categories by clustering according to the similarity of the task attributes. Nodes corresponding to task attributes of a same category are set to share a common parent node. In order to improve efficiency of the cluster analysis, similarity measurements can be used for clustering. Therefore, optionally, the clustering of the nodes in a network layer to obtain a parent node may include the following steps.

In the first step, generating a similarity measurement matrix corresponding to the task attributes of the nodes in the current network layer by using a preset similarity measurement algorithm based on the task attributes of the nodes.

In the second step, assigning multiple nodes having a similarity greater than a preset threshold into a same category according to the similarity measurement matrix.

In the third step, extracting a common part of the task attributes of the multiple nodes in the same category as the task attribute for a parent node of the multiple nodes.

The preset similarity measurement algorithm may include, but not limited to, Euclidean distance, Manhattan distance, Chebyshev distance, Minkowski distance, standardized Euclidean distance, Mahalanobis distance, included angle cosine, Hamming distance, etc. A similarity measurement matrix for task attributes may be generated through one of those algorithms. According to the similarity measurement matrix, if similarity of multiple task attributes is greater than the preset threshold, it means that the multiple task attributes are relatively similar, and the nodes that implement these task attributes may be assigned into a same category. It is possible to calculate the common part of these task attributes once, and the unique part of each of the task attributes is executed after the calculation of the common part of the task attributes. As a result, the redundancy in the neural networks can be effectively reduced, thereby improving the operation efficiency.

At step S103, a network parameter of each parent node is trained based on a task attribute of this parent node.

After the a task attribute(s) for each parent node is determined, a task(s) to be implemented by the parent node can be determined. A conventional neural network model may be used to achieve the task. Training is required to determine a network parameter(s) of the parent node, such that the output of the parent node can satisfy the requirements of tasks of neural networks acting as child nodes of this parent node. Therefore, to determine the network parameter of each parent node, the parent node can be trained in the following ways.

For any parent node, output features from child nodes of this parent node are used as input of the parent node, to train the network parameter of the parent node based on the task attributes of the parent node.

The training of the network parameter of a parent node can be achieved by using output features from child nodes of the parent node as the input of the parent node, and by adjusting the network parameter repeatedly until the output features from the child nodes meet specified tasks. For the leaf nodes of the tree-like network topology, the last layer of the neural network topology is usually an instantaneous function; and the last second layer is a feature layer, that is, the output of the last second layer is an encoded feature. Therefore, the output of the last second layer is used as the input of a node at an upper layer.

Different features may have an impact on each other. Thus, if the features inputted into the parent node have a same weight, the result obtained from the calculations of the parent node and the child nodes may be significantly different from a desired task result. With such consideration, the parent node may be composed of any structure with a signal control mechanism, such as LSTM (Long Short-Term Memory) network mechanism, Attention mechanism, GRU (Gated Recurrent Unit) network mechanism, etc. The input of the parent node is weighted, and the weighted input, as a combination of the weighted features, is used to train the network parameter of the parent node, and the weights are adjusted during the training. That is, the network parameters of the parent nodes may also be trained by the following steps:

for any parent node, generating the parent node using a preset structure with a feature signal control mechanism based on a task attribute of the parent node; obtaining and weighting output features associated with the task attribute in output features of child nodes of the parent node; and training a network parameter of the parent node according a combination of the weighted output features.

The parent nodes can be composed of any structure with a signal control mechanism. This means that, for a specified task attribute, feature signals related to the task attribute are selected automatically and feature signals not related to the task attribute are eliminated. Further, with the weighting, a larger weight may be assigned to the valid part of a child node, and a smaller weight may be assigned to the invalid part. In this way, a desired task effect can be underlined in the task result and the invalid part can be screened, thereby improving the performance on specified tasks.

At step S104, after completion of training all nodes in all network layers, training of a deep neural network corresponding to the tree-like network topology is determined to be completed.

The nodes of a network layer in the tree-like network topology can be obtained based on the above process. Nodes in each of the network layers are trained. After the training, the deep neural network corresponding to the tree-like network topology can be determined.

Optionally, the step of determining the completion of the training of the deep neural network may specifically include:

training nodes in each network layer starting from a network layer where the leaf nodes are located and in a sequence from a bottom layer to a top layer, to determine network parameters of each node in each network layer; and determining that the training of the deep neural network corresponding to the tree-like network topology is completed after completion of training of all nodes in the top layer.

The execution subject may periodically detect whether there a new neural network is added. If a new neural network corresponding to a specified task is added, the neural network will be used as a leaf node of the tree-like network topology, and training is performed from the bottom layer to the top layer till the root node according to the above process. To ensure consistency of an update, nodes in a same network layer are trained independently from each other and will not be interfered by other nodes.

In the embodiments, a tree-like network topology is constructed, and task attributes of nodes in a current network layer that has been trained in the tree-like network topology are obtained. Cluster analysis is performed on the nodes in the current network layer based on the task attributes, and a common part of task attributes of multiple nodes in a same category is used as a task attribute for a parent node of the multiple nodes. Then, a network parameter of each parent node can be trained based on the task attribute of this parent node. After completing the training of all nodes of all network layers, it can be determined that training of a deep neural network corresponding to the tree-like network topology is completed. The trained deep neural network can implement multiple tasks. Leaf nodes in the tree-like network topology are neural networks that have been trained for specified tasks. Thus, a neural network corresponding to a specified task can be reused by extracting a common part of task attributes of nodes in a network layer. A complete deep neural network can be used to implement multiple specified tasks through operations of network layers in tree-like network topology one by one. Further, the nodes are divided into categories by clustering based on their task attributes. A parent node for nodes of a same category can be constructed, and the parent node can realize a common task of its child nodes. Therefore, this can effectively reduce the redundancy between the neural networks and thereby improving the operation efficiency of deep learning.

Figure 2:
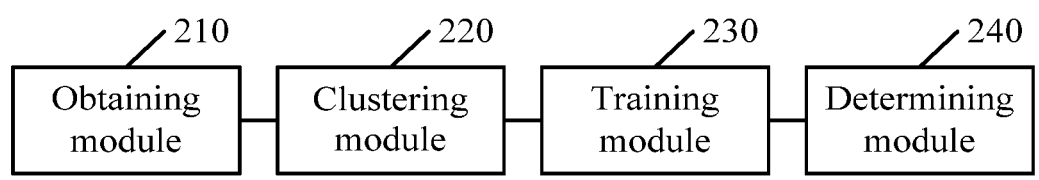
FIG. 2 is a schematic structural diagram of a deep neural network training apparatus according to an embodiment of the present application.

Corresponding to the above method embodiments, an embodiment of the present application provides a deep neural network training apparatus. As shown in FIG. 2, the deep neural network training apparatus may include: an obtaining module 210, a clustering module 220, a training module 230, and a determining module 240.

The obtaining module 210 is configured for obtaining task attributes of nodes in a current network layer in a tree-like network topology, wherein the nodes in the tree-like network topology correspond to neural networks for different tasks, and a leaf node in the tree-like network topology is a neural network that has been trained for a specified task.

The clustering module 220 is configured for performing cluster analysis on the nodes in the current network layer based on the task attributes of the nodes in the current network layer and extracting a common part of task attributes of multiple nodes in a same category as a task attribute for a parent node of the multiple nodes.

The training module 230 is configured for training a network parameter of each parent node based on a task attribute of this parent node.

The determining module 240 is configured for determining that training of a deep neural network corresponding to the tree-like network topology is completed, after completion of training of all nodes in all network layers.

Optionally, the clustering module 220 may be specifically configured for:

generating a similarity measurement matrix corresponding to the task attributes of the nodes in the current network layer by using a preset similarity measurement algorithm based on the task attributes of the nodes;

assigning multiple nodes having a similarity greater than a preset threshold into a same category according to the similarity measurement matrix; and extracting a common part of the task attributes of the multiple nodes in the same category as the task attribute for a parent node of the multiple nodes.

Optionally, the training module 230 may be specifically configured for:

for any parent node, using output features of child nodes of the parent node as input of the parent node, to train a network parameter of the parent node based on the task attribute of the parent node.

Optionally, the training module 230 may be specifically configured for:

for any parent node, generating the parent node using a preset structure with a feature signal control mechanism based on a task attribute of the parent node; obtaining and weighting output features associated with the task attribute in output features of child nodes of the parent node; and training a network parameter of the parent node according a combination of the weighted output features.

Optionally, the determining module 240 may be specifically configured for:

training nodes in each network layer starting from a network layer where the leaf nodes are located and in a sequence from a bottom layer to a top layer, to determine network parameters of each node in each network layer; and determining that the training of the deep neural network corresponding to the tree-like network topology is completed after completion of training of all nodes in the top layer.

In the embodiments, a tree-like network topology is constructed, and task attributes of nodes in a current network layer that has been trained in the tree-like network topology are obtained. Cluster analysis is performed on the nodes in the current network layer based on the task attributes, and a common part of task attributes of multiple nodes in a same category is used as a task attribute for a parent node of the multiple nodes. Then, a network parameter of each parent node can be trained based on the task attribute of this parent node. After completing the training of all nodes of all network layers, it can be determined that training of a deep neural network corresponding to the tree-like network topology is completed. The trained deep neural network can implement multiple tasks. Leaf nodes in the tree-like network topology are neural networks that have been trained for specified tasks. Thus, a neural network corresponding to a specified task can be reused by extracting a common part of task attributes of nodes in a network layer. A complete deep neural network can be used to implement multiple specified tasks through operations of network layers in tree-like network topology one by one. Further, the nodes are divided into categories by clustering based on their task attributes. A parent node for nodes of a same category can be constructed, and the parent node can realize a common task of its child nodes. Therefore, this can effectively reduce the redundancy between the neural networks and thereby improving the operation efficiency of deep learning.

Corresponding to the deep neural network training method provided by the above embodiments, an embodiment of the present application provides a computer readable storage medium storing executable codes that, when executed, cause the deep neural network training method provided by the above embodiments performed.

In the embodiment, the computer readable storage medium stores the executable codes that, when executed, implement the deep neural network training method provided by the embodiments of the present application. That is, a tree-like network topology is constructed, and task attributes of nodes in a current network layer that has been trained in the tree-like network topology are obtained. Cluster analysis is performed on the nodes in the current network layer based on the task attributes, and a common part of task attributes of multiple nodes in a same category is used as a task attribute for a parent node of the multiple nodes. Then, a network parameter of each parent node can be trained based on the task attribute of this parent node. After completing the training of all nodes of all network layers, it can be determined that training of a deep neural network corresponding to the tree-like network topology is completed. The trained deep neural network can implement multiple tasks. Leaf nodes in the tree-like network topology are neural networks that have been trained for specified tasks. Thus, a neural network corresponding to a specified task can be reused by extracting a common part of task attributes of nodes in a network layer. A complete deep neural network can be used to implement multiple specified tasks through operations of network layers in tree-like network topology one by one. Further, the nodes are divided into categories by clustering based on their task attributes. A parent node for nodes of a same category can be constructed, and the parent node can realize a common task of its child nodes. Therefore, this can effectively reduce the redundancy between the neural networks and thereby improving the operation efficiency of deep learning.

In addition, corresponding to the deep neural network training method provided by the above embodiments, an embodiment of the present application provides an application program that, when executed, implements the deep neural network training method provided by the above embodiments.

In the embodiment, the application program, when executed, implements the deep neural network training method provided by the embodiments of the present application. That is, a tree-like network topology is constructed, and task attributes of nodes in a current network layer that has been trained in the tree-like network topology are obtained. Cluster analysis is performed on the nodes in the current network layer based on the task attributes, and a common part of task attributes of multiple nodes in a same category is used as a task attribute for a parent node of the multiple nodes. Then, a network parameter of each parent node can be trained based on the task attribute of this parent node. After completing the training of all nodes of all network layers, it can be determined that training of a deep neural network corresponding to the tree-like network topology is completed. The trained deep neural network can implement multiple tasks. Leaf nodes in the tree-like network topology are neural networks that have been trained for specified tasks. Thus, a neural network corresponding to a specified task can be reused by extracting a common part of task attributes of nodes in a network layer. A complete deep neural network can be used to implement multiple specified tasks through operations of network layers in tree-like network topology one by one. Further, the nodes are divided into categories by clustering based on their task attributes. A parent node for nodes of a same category can be constructed, and the parent node can realize a common task of its child nodes. Therefore, this can effectively reduce the redundancy between the neural networks and thereby improving the operation efficiency of deep learning.

Figure 3:
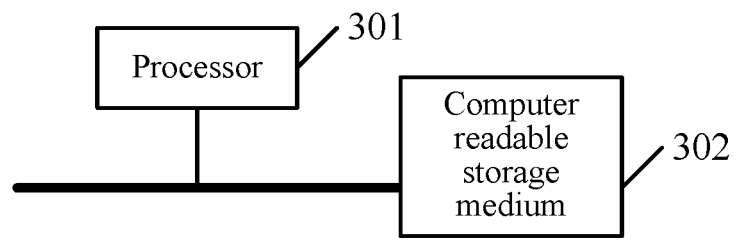
FIG. 3 is a schematic structural diagram of a computer device according to an embodiment of the present application.

An embodiment of the present application also provides a computer device, as shown in FIG. 3, which includes a processor 301 and a computer readable storage medium 302.

The computer readable storage medium 302 is configured for storing the executable code.

The processor 301 is configured for executing the executable code stored on the computer readable storage medium 302 to carry out the deep neural network training method provided by the above embodiments.

The computer readable storage medium 302 and the processor 301 can communicate data with each other via a wired connection or a wireless connection. The computer device can communicate with other devices through a wired communication interface or a wireless communication interface.

The computer readable storage medium may include RAM (Random Access Memory), or NVM (Non-Volatile Memory), for example, at least one disk memory. Optionally, the computer readable storage medium may also be at least one storage device located away from the processor.

The processor may be a general-purpose processor, including CPU (Central Processing Unit), NP (Network Processor), etc. It may also be DSP (Digital Signal Processing), ASIC (Application Specific Integrated Circuit), FPGA (Field-Programmable Gate Array) or other programmable logic devices, discrete gates or transistor logic devices, or discrete hardware components.

In the embodiment, the processor of the computer device can implement the embodiments of the deep neural network training method above by reading and executing the executable codes stored on the computer readable storage medium. That is, a tree-like network topology is constructed, and task attributes of nodes in a current network layer that has been trained in the tree-like network topology are obtained. Cluster analysis is performed on the nodes in the current network layer based on the task attributes, and a common part of task attributes of multiple nodes in a same category is used as a task attribute for a parent node of the multiple nodes. Then, a network parameter of each parent node can be trained based on the task attribute of this parent node. After completing the training of all nodes of all network layers, it can be determined that training of a deep neural network corresponding to the tree-like network topology is completed. The trained deep neural network can implement multiple tasks. Leaf nodes in the tree-like network topology are neural networks that have been trained for specified tasks. Thus, a neural network corresponding to a specified task can be reused by extracting a common part of task attributes of nodes in a network layer. A complete deep neural network can be used to implement multiple specified tasks through operations of network layers in tree-like network topology one by one. Further, the nodes are divided into categories by clustering based on their task attributes. A parent node for nodes of a same category can be constructed, and the parent node can realize a common task of its child nodes. Therefore, this can effectively reduce the redundancy between the neural networks and thereby improving the operation efficiency of deep learning.

Here, a brief description is provided to embodiments of the computer readable storage medium, the application program, and the computer device in view of their resemblance with the method embodiments. Relevant details can be known with reference to the description of the method embodiments.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All of the embodiments in the description are described in a correlated manner, and description of a component in an embodiment may apply to another containing the same. The description for each embodiment focuses on the differences from other embodiments. In particular, a brief description is provided to embodiments of the computer readable storage medium, the application program, and the computer device in view of their resemblance with the method embodiments. Relevant details can be known with reference to the description of the method embodiments.

The description is only for preferred embodiments of the present application, and are not intended to limit the scope of protection of the present application. Any modifications, substitutions, improvements, etc., which are made within the spirit and principles of the present application, will fall into the protection scope of the present application.

The invention claimed is:

1. A deep neural network training method, comprising:
    obtaining task attributes of nodes that has been trained in a current network layer in a tree-like network topology, wherein the nodes in the tree-like network topology correspond to neural networks for different tasks;
    performing cluster analysis on the nodes that has been trained in the current network layer based on the task attributes of the nodes in the current network layer and extracting a common part of task attributes of multiple nodes in a same category as a task attribute for a parent node of the multiple nodes;
    training a network parameter of each parent node based on the task attribute of this parent node; and
    determining that training of a deep neural network corresponding to the tree-like network topology is completed, after completion of training of all nodes in all network layers;
    wherein training a network parameter of each parent node based on the task attribute of this parent node comprises:
    for any parent node, generating the parent node using a preset structure with a feature signal control mechanism based on the task attribute of the parent node; obtaining and weighting output features associated with the task attribute in output features of child nodes of the parent node; and training a network parameter of the parent node according a combination of the weighted output features.

2. The method according to claim 1, wherein performing cluster analysis on the nodes in the current network layer based on the task attributes of the nodes in the current network layer and extracting a common part of task attributes of multiple nodes in a same category as the task attribute for a parent node of the multiple nodes, comprises:
    generating a similarity measurement matrix corresponding to the task attributes of the nodes in the current network layer by using a preset similarity measurement algorithm based on the task attributes of the nodes;
    assigning multiple nodes having a similarity greater than a preset threshold into a same category according to the similarity measurement matrix; and
    extracting a common part of the task attributes of the multiple nodes in the same category as the task attribute for a parent node of the multiple nodes.

3. The method according to claim 1, wherein training a network parameter of each parent node based on the task attribute of this parent node comprises:
    for any parent node, using output features of child nodes of the parent node as input of the parent node, to train a network parameter of the parent node based on the task attribute of the parent node.

4. The method according to claim 1, wherein determining that training of a deep neural network corresponding to the tree-like network topology is completed, after completion of training of all nodes in all network layers comprises:
    training nodes in each network layer starting from a network layer where the leaf nodes are located and in a sequence from a bottom layer to a top layer, to determine network parameters of each node in each network layer; and
    determining that the training of the deep neural network corresponding to the tree-like network topology is completed after completion of training of all nodes in the top layer.

5. A non-transitory computer readable storage medium, having stored thereon executable program codes that, when executed, perform the deep neural network training method according to claim 1.

6. A computer device, comprising a processor and a computer readable storage medium, wherein
the computer readable storage medium is configured for storing executable codes; and
the processor is configured for carrying out the deep neural network training method of claim 1 by executing the executable codes stored on the computer readable storage medium.

7. A deep neural network training apparatus, comprising:
an obtaining module, configured for obtaining task attributes of nodes that has been trained in a current network layer in a tree-like network topology, wherein the nodes in the tree-like network topology correspond to neural networks for different tasks;
a clustering module, configured for performing cluster analysis on the nodes that has been trained in the current network layer based on the task attributes of the nodes in the current network layer and extracting a common part of task attributes of multiple nodes in a same category as a task attribute for a parent node of the multiple nodes;
a training module, configured for training a network parameter of each parent node based on the task attribute of this parent node; and
a determining module, configured for determining that training of a deep neural network corresponding to the tree-like network topology is completed, after completion of training of all nodes in all network layers;
wherein the training module is further configured for:
for any parent node, generating the parent node using a preset structure with a feature signal control mechanism based on the task attribute of the parent node;
obtaining and weighting output features associated with the task attribute in output features of child nodes of the parent node; and
training a network parameter of the parent node according a combination of the weighted output features.

8. The apparatus according to claim 7, wherein the clustering module is further configured for:
generating a similarity measurement matrix corresponding to the task attributes of the nodes in the current network layer by using a preset similarity measurement algorithm based on the task attributes of the nodes;
assigning multiple nodes having a similarity greater than a preset threshold into a same category according to the similarity measurement matrix; and
extracting a common part of the task attributes of the multiple nodes in the same category as the task attribute for a parent node of the multiple nodes.

9. The apparatus according to claim 7, wherein the training module is further configured for:
for any parent node, using output features of child nodes of the parent node as input of the parent node, to train a network parameter of the parent node based on the task attribute of the parent node.

10. The apparatus according to claim 7, wherein the determining module is further configured for:
training nodes in each network layer starting from a network layer where the leaf nodes are located and in a sequence from a bottom layer to a top layer, to determine network parameters of each node in each network layer; and
determining that the training of the deep neural network corresponding to the tree-like network topology is completed after completion of training of all nodes in the top layer.

* * * * *